(12) United States Patent
Seko

(10) Patent No.: US 9,897,273 B2
(45) Date of Patent: Feb. 20, 2018

(54) LIGHT EMITTING APPARATUS AND VEHICLE LIGHTING FIXTURE

(71) Applicant: Stanley Electric Co., Ltd., Tokyo (JP)

(72) Inventor: Toshihiro Seko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 15 days.

(21) Appl. No.: 15/154,004

(22) Filed: May 13, 2016

(65) Prior Publication Data

US 2016/0334071 A1 Nov. 17, 2016

(30) Foreign Application Priority Data

May 13, 2015 (JP) .................................. 2015-097932

(51) Int. Cl.
| | |
|---|---|
| *F21V 7/04* | (2006.01) |
| *F21S 8/10* | (2006.01) |
| *F21V 23/00* | (2015.01) |
| *F21V 23/06* | (2006.01) |
| *F21V 8/00* | (2006.01) |
| *G02B 6/38* | (2006.01) |
| *G02B 6/42* | (2006.01) |

(Continued)

(52) U.S. Cl.
CPC ........ *F21S 48/1241* (2013.01); *B60Q 1/0088* (2013.01); *F21S 48/1145* (2013.01); *F21S 48/2293* (2013.01); *F21V 23/001* (2013.01); *F21V 23/003* (2013.01); *F21V 23/06* (2013.01); *G02B 6/0008* (2013.01); *G02B 6/3817* (2013.01); *G02B 6/4296* (2013.01); *F21Y 2101/00* (2013.01); *G02B 2006/4297* (2013.01)

(58) Field of Classification Search
CPC .................................................... G02B 6/4298
USPC ........................................................ 362/553
See application file for complete search history.

(56) References Cited

U.S. PATENT DOCUMENTS 4,860,172 A * 8/1989 Schlager .............. G02B 6/0006
362/253

FOREIGN PATENT DOCUMENTS

| | | |
|---|---|---|
| DE | 28 49 543 A1 | 5/1980 |
| EP | 2 713 410 A1 | 4/2014 |
| JP | 56-59212 A | 5/1981 |

(Continued)

OTHER PUBLICATIONS

The extended European search report for the related European Patent Application No. 161695313 dated Sep. 20, 2016.

*Primary Examiner* — Jamara Franklin
(74) *Attorney, Agent, or Firm* — Kenealy Vaidya LLP

(57) ABSTRACT

A light emitting apparatus can include: a first connecting part and a second connecting part connected to each other to form a propagation channel therebetween through which laser beam from a laser light source can propagate, and a power supply cable including a pair of terminals provided in a middle thereof and connected to and separated from each other. One of the terminals can be included in the first connecting part and the other thereof can be included in the second connecting part. When the first connecting part and the second connecting part are connected to each other, the terminals can be connected to each other to constitute a supply channel configured to supply drive power to a driving circuit. When the first and second connecting parts are disconnected, the connected terminals can be separated from each other to cut off the supply channel.

19 Claims, 4 Drawing Sheets

(51) Int. Cl.
*B60Q 1/00* (2006.01)
*F21Y 101/00* (2016.01)

(56) References Cited

FOREIGN PATENT DOCUMENTS

| JP | 11-133275 A | 5/1999 |
| JP | 2004-260027 A | 9/2004 |

* cited by examiner

LIGHT EMITTING APPARATUS AND VEHICLE LIGHTING FIXTURE

This application claims the priority benefit under 35 U.S.C. § 119 of Japanese Patent Application No. 2015-097932 filed on May 13, 2015, which is hereby incorporated in its entirety by reference.

TECHNICAL FIELD

The presently disclosed subject matter relates to light emitting apparatuses and vehicle lighting fixtures. In particular, the presently disclosed subject matter relates to a light emitting apparatus configured to include a first connecting part and a second connecting part to be connected to each other, thereby forming a propagation channel therebetween for laser beam from a laser light source to propagate therethrough, as well as a vehicle lighting unit using the same.

BACKGROUND ART

There have been proposed apparatuses configured to include a first connecting part and a second connecting part to be connected to each other, thereby forming a propagation channel therebetween for laser beam from a laser light source to propagate therethrough, as those disclosed in Japanese Patent Application Laid-Open No. 2004-260027, for example.

In Japanese Patent Application Laid-Open No. 2004-260027, the first connecting part such as a first optical connector 12 and the second connecting part such as a third optical connector 41 are connected to each other to form a propagation channel therebetween allowing laser beam from a laser light source to propagate therethrough. In this structure, when the connection between the first and second connecting parts is released, the output of the laser beam can be terminated.

When such laser beam is used for illumination purpose, the output of such laser beam is required to be within a permissible exposure time (as illustrated in FIG. 4) from the viewpoint of safety (equal to or lower than class 2 in accordance with JIS C 6802). The apparatus disclosed in Japanese Patent Application Laid-Open No. 2004-260027 requires substantial time (μs order or longer) from the release of the connection between the first and second connecting parts to the termination of the output of the laser beam. Therefore, during the time from the release of the connection between the first and second connecting parts to the termination of the output of the laser beam, it is difficult for the apparatus to be controlled so that the output of laser beam from the first or second connecting part is within the permissible exposure time.

Note that the reason why there is required a substantial time till the termination of the output of the laser beam is as follows. Such a time period from the release of the connection between the first and second connecting parts to the termination of the output of the laser beam is required for executing process by a software (program) for controlling a plurality of circuits and actual processes performed by the respective circuits. The circuits may include an optical connector connection determination circuit, a light-reception termination determination circuit, a light-reception termination signal transmitting circuit, a light-reception termination signal receiving circuit, and a laser emission shutoff circuit, which will be collectively referred to as a "shutoff control circuit" hereinafter.

SUMMARY

The presently disclosed subject matter was devised in view of these and other problems and features in association with the conventional art. According to an aspect of the presently disclosed subject matter, a light emitting apparatus can include a first connecting part and a second connecting part to be connected to each other, thereby forming a propagation channel therebetween for laser beam from a laser light source to propagate therethrough, as well as a vehicle lighting unit using the same. The light emitting apparatus can reduce the time period from the release of the connection between the first and second connecting parts to the termination of the output of the laser beam, thereby preventing the emission of laser beam to the outside from the first or second connecting part during the time from the release of the connection between the first and second connecting parts to the termination of the output of the laser beam. Also, there is provided a vehicle lighting fixture using such a light emitting apparatus.

According to another aspect of the presently disclosed subject matter, a light emitting apparatus can include: a laser light source; a driving circuit configured to supply a drive current to the laser light source; a power supply cable configured to supply drive power to the driving circuit; a first connecting part; and a second connecting part configured to be connected to the first connecting part. The first connecting part and the second connecting part can be connected to each other to form a propagation channel between the first and second connecting parts through which laser beam from the laser light source can propagate. The power supply cable can include a pair of terminals provided in a middle thereof and connected to and separated from each other, one of which can be included in the first connecting part and the other of which can be included in the second connecting part. When the first connecting part and the second connecting part are connected to each other, the one of the terminals of the power supply cable and the other terminal can be connected to each other to constitute a supply channel configured to supply the drive power to the driving circuit. When the first and second connecting parts are disconnected, the connected terminals of the power supply cable can be separated from each other to cut off the supply channel configured to supply the drive power to the driving circuit.

The light emitting apparatus with the above-described configuration can reduce the time period from the release of the connection between the first and second connecting parts to the termination of the output of the laser beam, thereby preventing the emission of laser beam to the outside from the first or second connecting part during the time from the release of the connection between the first and second connecting parts to the termination of the output of the laser beam.

The light emitting apparatus does not employ a shutoff control circuit as in the conventional art, but employs the configuration in which the terminals of the power supply cable can be disconnected (namely, the supply channel for supplying drive power to the driving circuit can be shutoff) at the same time (or substantially same time) of the disconnection between the first and second connecting parts. With this configuration, the output of the laser beam can be instantaneously stopped by the disconnection between the first and second connecting parts.

According to another aspect of the presently disclosed subject matter, the light emitting apparatus with the above-mentioned configuration can further include: a first optical member; and an optical fiber configured to propagate the laser beam from the laser light source to the first optical member. The optical fiber can include a pair of end parts provided in a middle thereof and connected to and separated from each other. The first connecting part can include one of the pair of end parts of the optical fiber and the one terminal of the pair of terminals of the power supply cable. The second connecting part can include the other of the pair of end parts of the optical fiber and the other terminal of the pair of terminals of the power supply cable. When the first connecting part and the second connecting part are connected to each other, the one end part of the optical fiber and the other end part thereof are connected to each other so as to constitute a propagation channel configured to propagate the laser beam from the laser light source to the first optical member, and the one terminal of the power supply cable and the other terminal thereof are connected to each other so as to constitute the supply channel configured to supply the drive power to the driving circuit. When the first and second connecting parts are disconnected, the connected end parts of the optical fiber can be separated from each other to cut off the propagation channel configured to propagate the laser beam from the laser light source to the first optical member as well as the connected terminals of the power supply cable can be separated from each other to cut off the supply channel configured to supply the drive power to the driving circuit.

The light emitting apparatus with the above-described configuration can also provide the same advantageous effects as described above.

The light emitting apparatus with the above-mentioned configuration can further include a protective tube configured to cover the optical fiber to protect the optical fiber.

According to still another aspect of the presently disclosed subject matter, the light emitting apparatus with the aforementioned configuration can be configured such that the first optical member can be a member configured to perform any of mixing, scattering, dispersing, and wavelength-converting laser beams propagating through the optical fiber.

With this configuration, the light emitting apparatus can emit light produced by any of mixing, scattering, dispersing, and wavelength-converting laser beams According to still another aspect of the presently disclosed subject matter, the light emitting apparatus with any of the afore-mentioned aspects can be configured to further include a second optical member configured to form a predetermined light distribution pattern by any of reflecting, deflecting, scattering, and shielding light derived from the first optical member.

The light emitting apparatus with the above-mentioned configuration can achieve the formation of the predetermined light distribution pattern.

According to still further another aspect of the presently disclosed subject matter, a vehicle lighting fixture can include the light emitting apparatus according to any one of the aforementioned aspects.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle lighting fixture of the presently disclosed subject matter with reference to the accompanying drawings in accordance with exemplary embodiments.

Figure 1:
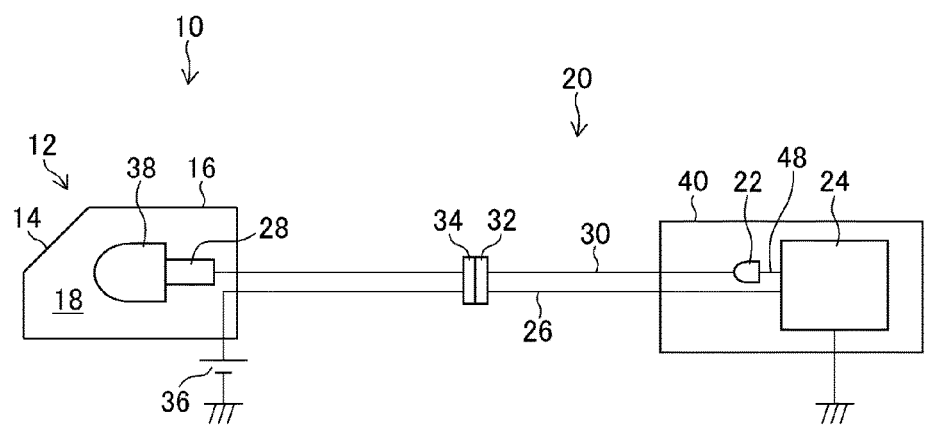
FIG. 1 is a schematic diagram illustrating a vehicle lighting fixture 10 utilizing a light emitting apparatus 20 made in accordance with principles of the presently disclosed subject matter as an exemplary embodiment.

FIG. 1 is a schematic diagram illustrating a vehicle lighting fixture 10 utilizing a light emitting apparatus 20 made in accordance with the principles of the presently disclosed subject matter as an exemplary embodiment.

As illustrated in FIG. 1, the vehicle lighting fixture 10 of this exemplary embodiment can include a light emitting apparatus 20, and a lighting unit 12, etc. The lighting unit 12 can be configured to project light from the light emitting apparatus 20 forward to form a predetermined light distribution pattern.

Specifically, the lighting unit 12 can be configured to form a low-beam light distribution pattern or a high-beam light distribution pattern, and can be achieved by any well-known lighting unit. The vehicle lighting fixture 10 can further include a cover lens 14 and a housing 16 to be assembled thereto to form a lighting chamber 18 containing the lighting unit 12.

The light source apparatus 20 can include: a laser light source 22: a driving circuit 24 configured to be electrically connected to the laser light source 22 to supply a drive current to the laser light source 22; a power supply cable 26 configured to be electrically connected to a power source 36 such as a battery and to the driving circuit 24 so as to supply drive power to the driving circuit 24; a first optical member 28; an optical fiber 30 configured to propagate laser beam from the laser light source 22 to the first optical member 28; a first connecting part 32; and a second connecting part 34 configured to be freely connected (attached) to the first connecting part 32. The first connecting part 32 and the second connecting part 34 can be connected to each other to form a propagation channel between the first and second connecting parts 32 and 34 through which laser beam from the laser light source 22 can propagate.

The laser light source 22 can be configured by a semiconductor laser element such as a laser diode to emit laser beam (such as blue laser beam) when being supplied with a drive current from the driving circuit 24. The laser beam from the laser light source 22 can be condensed by a condenser lens (not illustrated) to be propagated through the optical fiber 30 to the first optical member 28.

The optical fiber 30 can include a core having an incident end face on which the laser beam emitted from the laser light source 22 and condensed by the condenser lens is incident and an output end face configured to emit the propagated laser beam. Further included is a cladding layer surrounding the core. Note that the core and cladding layer are not illustrated. The material and cross-sectional shape of the optical fiber 30 are not particularly limited, and various materials and cross-sectional shapes can be adopted.

Figure 2A:
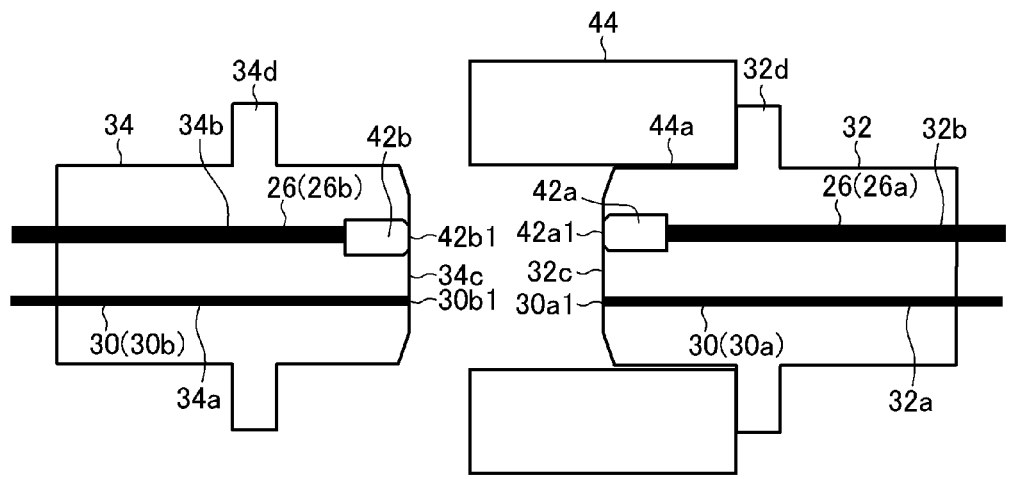
FIGS. 2A and 2B are enlarged schematic diagrams illustrating the vicinity of a first connecting part 32 and a second connecting part 34 when they are disconnected and connected, respectively.

As illustrated in FIG. 2A, the optical fiber 30 can include a pair of end parts 30a (including tip end face 30a1) and 30b (including tip end face 30b1) provided in a middle thereof. The end parts 30a and 30b can be connected to and separated from each other. Here, the optical fiber 30 can be secured to a casing 40 side at the incident end side and to a lighting unit 12 side (for example, to the housing 16) at the output end side.

The first optical member 28 can be a member configured to perform any of mixing, scattering, dispersing, and wavelength-converting laser beams propagating through the optical fiber 30. For example, the first optical member 28 can be constituted by a wavelength conversion member configured to receive the laser beam propagated through the optical fiber 30 and convert at least part of the laser beam to light having a different wavelength. Examples of the wavelength conversion member may include a yellow phosphor when the laser light source 22 can emit blue laser beam. In this case, the wavelength conversion member having received the laser beam propagated through the optical fiber 30 can emit white light (pseudo white light) by color mixture of the original blue laser beam having passed through the wavelength conversion member and the yellow light emitted by the wavelength conversion member (yellow phosphor).

The first optical member 28 can include a diffusion member (a diffusion plate or a diffusion layer) disposed between the optical fiber 30 on the output end part side and the wavelength conversion member. In this case, examples of the diffusion member may be those described in Japanese Patent Application Laid-Open No. 2014-067961.

The light (white light) from the first optical member 28 can be projected forward by the second optical member 38, constituting the lighting unit 12, to form a predetermined light distribution pattern.

The second optical member 38 can be a member configured to form a predetermined light distribution pattern by any of reflecting, deflecting, scattering, and shielding light derived from the first optical member 28 of the light emitting apparatus 20. The second optical member 30 can be configured by at least one of a projector lens and a reflecting mirror (reflector).

The laser light source 22 and the driving circuit 24 can be disposed within the casing 40. The driving circuit 24 may be disposed outside the casing 40. The casing 40 may be provided with a heat dissipation member and/or a heat conductive member (both not illustrated) to dissipate heat generated by the laser light source 22. Alternatively, the casing 40 itself can be allowed to function as a heat dissipation member and/or a heat conductive member.

When the light emitting apparatus 20 is used as a light source of the lighting unit 12, the lighting unit 12 may be provided with a heat dissipation member and/or a heat conductive member (for example, within the lighting chamber 18). Alternatively, the lighting unit 12 itself can be allowed to function as a heat dissipation member and/or a heat conductive member.

The power supply cable 26 can include a pair of connectable end parts 26a and 26b provided in a middle thereof, which can be connected to and disconnected from each other. The pair of end parts 26a and 26b of the power supply cable 26 can be electrically connected to a pair of terminals 42a and 42b, respectively.

The first connecting part 32, as illustrated in FIG. 2A, can include one end part 30a of the pair of end parts of the optical fiber 30 and one terminal 42a of the pair of terminals of the power supply cable 26. Specifically, the first connecting part 32 can have a first through hole 32a, into which the end part 30a of the optical fiber 30 can be inserted to thereby be fixed to the first connecting part 32. The first connecting part 32 can further have a second through hole 32b, into which the terminal 42a (and the end part 26a) of the power supply cable 26 can be inserted to thereby be fixed to the first connecting part 32.

The tip end face 30a1 of the end part 30a of the optical fiber 30 and tip end face 42a1 of the terminal 42a of the power supply cable 26 can be flush with (or substantially flush with) the tip end face 32c of the first connecting part 32 or can project slightly from the tip end face 32c of the first connecting part 32. The tip end face 30a1 of the end part 30a of the optical fiber 30 may be slightly recessed from the tip end face 32c of the first connecting part 32.

The second connecting part 34 can include the other end part 30b of the pair of end parts of the optical fiber 30 and the other terminal 42b of the pair of terminals of the power supply cable 26. Specifically, the second connecting part 34 can have a first through hole 34a, into which the other end part 30b of the optical fiber 30 can be inserted to thereby be fixed to the second connecting part 34. The second connecting part 34 can further have a second through hole 34b, into which the other terminal 42b (and the end part 26b) of the power supply cable 26 can be inserted to thereby be fixed to the second connecting part 34.

The tip end face 30b1 of the end part 30b of the optical fiber 30 and tip end face 42b1 of the terminal 42b of the power supply cable 26 can be flush with (or substantially flush with) the tip end face 34c of the second connecting part 34 or can project slightly from the tip end face 34c of the second connecting part 34. The tip end face 30b1 of the end part 30b of the optical fiber 30 may be slightly recessed from the tip end face 34c of the second connecting part 34.

The first connecting part 32 and the second connecting part 34 can be disposed in desired positions in the middle of the optical fiber 30.

Figure 2B:
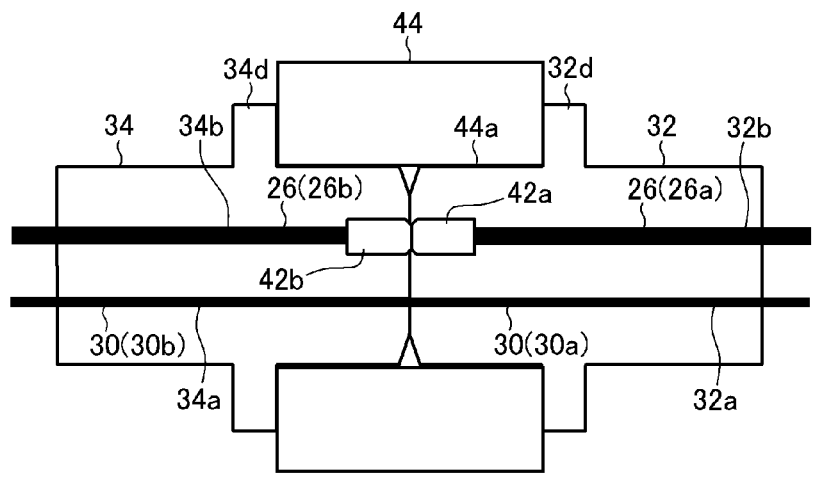

The housing 44 can include a through hole 44a, through which the first connecting part 32 and the second connecting part 34 can be inserted. In this case, the first connecting part 32 and the second connecting part 34 can include flange parts 32d and 34d at their outer peripheries in a peripheral direction, respectively, as illustrated in FIG. 2B. When the first connecting part 32 and the second connecting part 34 are inserted into the through hole 44a, the respective flange parts 32d and 34d thereof come into contact with the housing 44 to stop the insertion of the first and second connecting parts 32 and 34. By inserting the first and second connecting parts 32 and 34, the one end part 30a (tip end face 30a1) of the optical fiber 30 and the other end part 30b (tip end face 30b1) thereof can be connected to each other to constitute a propagation channel through which laser beam emitted from the laser light source 22 can be propagated to the first optical member 28. Furthermore, the one terminal 42a (tip end face 42a1) of the power supply cable 26 and the other terminal 42b (tip end face 42b1) can be connected to each other to constitute a supply channel configured to supply the drive power to the driving circuit 24. Further may be provided engaging members such as engaging claws, screws, and the like to secure the first and second connecting parts 32 and 34 to the housing 44 in a state that the propagation channel for the laser beam and the supply channel for the drive power are reliably formed.

When the first connecting part 32 and the second connecting part 34 are connected to each other as illustrated in FIG. 2B, the one end part 30a (tip end face 30a1) of the optical fiber 30 and the other end part 30b thereof (tip end face 30b1) can be connected to each other, so as to form the propagation channel configured to propagate the laser beam from the laser light source 22 to the first optical member 28. Furthermore, the one terminal 42a and the other terminal 42b of the power supply cable 26 can be connected to each other to constitute the supply channel configured to supply the drive power to the driving circuit 24.

On the other hand, when the first and second connecting parts 32 and 34 are disconnected, the connected end parts 30a and 30b of the optical fiber 30 can be separated from each other to cut off the propagation channel configured to propagate the laser beam from the laser light source 22 to the first optical member 28 as well as the connected terminals 42a and 42b of the power supply cable 26 can be separated from each other to cut off the supply channel configured to supply the drive power to the driving circuit 24.

The light emitting apparatus 20 can be configured such that the first and second connecting parts 32 and 34 are connected to each other to form the propagation channel configured to propagate the laser beam from the laser light source 22 between the first and second connecting parts 32 and 34. Thus, the light emitting apparatus 20 with the above-described configuration can reduce the time period from the release of the connection between the first and second connecting parts 32 and 34 to the termination of the output of the laser beam, thereby preventing the emission of laser beam to the outside during the time from the release of the connection between the first and second connecting parts 32 and 34 to the termination of the output of the laser beam.

The light emitting apparatus 20 does not employ a shutoff control circuit as in the conventional art, but employs the configuration in which the terminals 42a and 42b of the power supply cable 26 can be disconnected (namely, the supply channel for supplying drive power to the driving circuit 24 can be shutoff) at the same time (or substantially same time) of the disconnection between the first and second connecting parts 32 and 34. With this configuration, the output of the laser beam can be instantaneously stopped by the disconnection between the first and second connecting parts 32 and 34.

The inventor of the present application has confirmed that the light emitting apparatus 20 with the above-mentioned configuration can stop the output of laser beam within a permissible exposure time from the release of the connection between the first and second connecting parts 32 and 34 to the termination of the output of the laser beam.

Furthermore, in the light emitting apparatus 20 according to the aforementioned exemplary embodiment, it is possible to prevent power from being supplied to the driving circuit 24 without connecting the first connecting part 32 and the second connecting part 34 in the production/assembling process by an operator.

Furthermore, even when the first and second connecting parts 32 and 34 are erroneously disconnected by a user during the laser beam propagating through the optical fiber 30 from the laser light source 22, it is possible to prevent the laser beam from being emitted from the first connecting part 32 to the outside.

In the present exemplary embodiment, when the first connecting part 32 and the second connecting part 34 are disconnected from each other, the light emitting apparatus 20 can be separated into a part on the lighting unit 12 side and a part on the casing 40 side. This enables the production and assembling of the respective parts in different locations. Furthermore, they can be examined for optical, electrical, mechanical, and the like tests required during the production and assembling in different locations.

A description will now be given of modified examples.

Figure 3A:
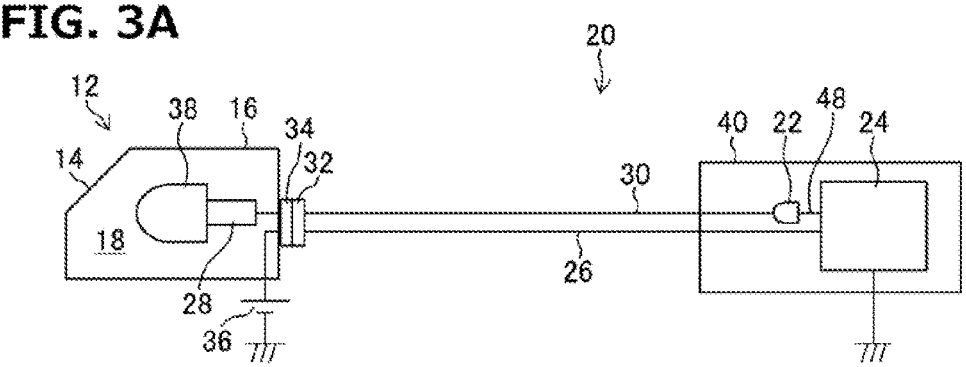
FIGS. 3A, 3B, 3C, and 3D are schematic diagrams each illustrating a modified example of the vehicle lighting fixture 10 utilizing the light emitting apparatus 20.
Figure 3B:
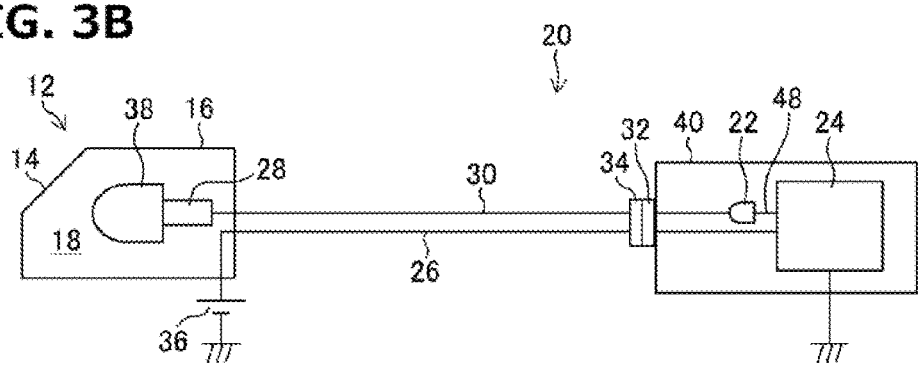

The light emitting apparatus 20 of the aforementioned configuration can be configured such that the respective connecting parts 32 and 34 are provided to the optical fiber 30 in the middle thereof. However, the first connecting part 32 may be provided to the output end side of the optical fiber 30 and the second connecting part 34 may be provided to the lighting unit 12 side, for example, to the housing 16. In another modified example, as illustrated in FIG. 3B, the first connecting part 32 may be provided to the casing 40 side and the second connecting part 34 may be provided to the incident end side of the optical fiber 30.

Figure 3C:
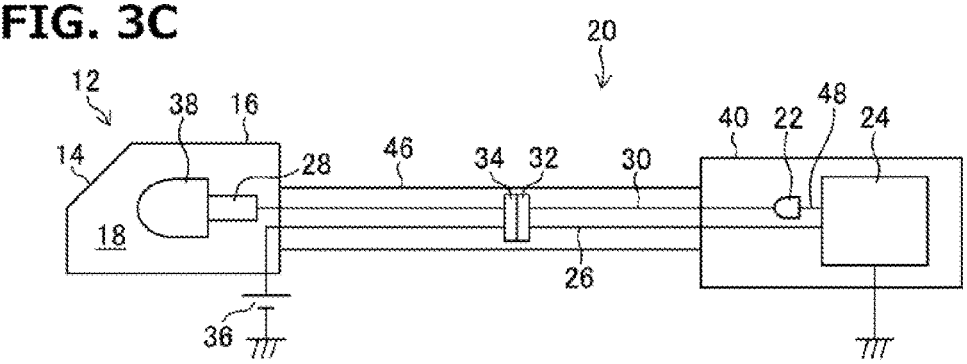

In still another modified example, as illustrated in FIG. 3C, there may be provided a protection tube 46 configured to cover the power supply cable 26, the optical fiber 30, and the first and second connecting parts 32 and 34. Examples of the protective tube 46 may include a tube having functions of water proof, dust protection, shock resistance, and the like so as to protect the power supply cable 26, the optical fiber 30, and the first and second connecting parts 32 and 34.

Figure 3D:
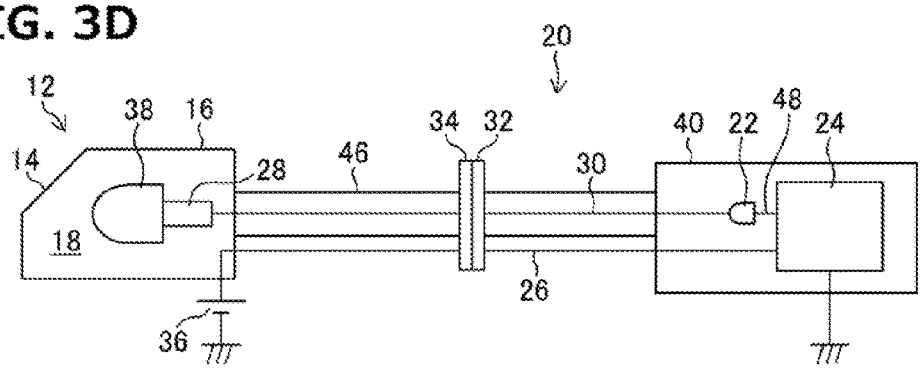
Figure 4:
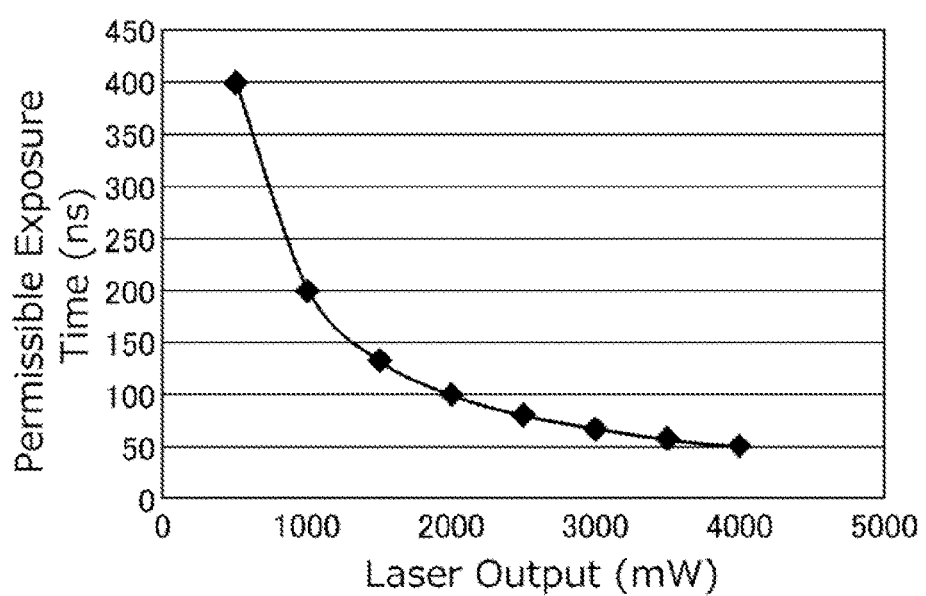
FIG. 4 is a graph showing a relationship between the laser output and the permissible exposure time.

Furthermore, as illustrated in FIG. 3D, the first and second connecting parts 32 and 34 may be provided to the protective tube 46 in the middle thereof. In other words, FIG. 3D shows the example where the optical fiber 30 and the like in the configuration of FIG. 1 are covered with the protective tube 46. In this case, the ends of the protective tube 46 may or may not be fixed to the respective connecting parts 32 and 34. Also with this configuration, the output of the laser beam can be instantaneously stopped by the disconnection between the first and second connecting parts 32 and 34.

In the aforementioned exemplary embodiment, the terminals 42a and 42b of the power supply cable 26 can be disconnected (namely, the supply channel for supplying drive power to the driving circuit 24 can be shutoff) at the same time (or substantially same time) of the disconnection between the first and second connecting parts 32 and 34. In another modified example, the light emitting apparatus 20 can include a cable 48 configured to connect the driving circuit 24 and the laser light source 22 as illustrated in FIG. 1. In this configuration, the first and second connecting parts 32 and 34 can be provided to the cable 48 in the middle thereof. In this modified example, also the connection between the driving circuit 24 and the laser light source 22 via the cable 48 can be disconnected at the same time (or substantially same time) of the disconnection between the first and second connecting parts 32 and 34.

In the aforementioned exemplary embodiment, there is used the housing 44 for connecting (securing) the first and second connecting parts 32 and 34. However, the housing 44 may be omitted and the first and second connecting parts 32 and 34 may directly be connected to each other by any known means such as an engaging claw, a screw and the like.

The light emitting apparatus and the vehicle lighting unit including the same can be configured such that the first and second connecting parts are connected to each other to form the propagation channel configured to propagate the laser beam from the laser light source between the first and second connecting parts. Furthermore, by the connection of the first and second connecting parts, the one terminal and the other terminal of the power supply cable can be connected to each other to constitute the supply channel configured to supply the drive power to the driving circuit. On the other hand, when the first and second connecting parts are disconnected, the connected terminals of the power supply cable can be separated from each other to cut off the supply channel configured to supply the drive power to the driving circuit. Thus, the time period from the release of the connection between the first and second connecting parts to the termination of the output of the laser beam can be reduced, thereby preventing the emission of laser beam to the outside during the time from the release of the connection between the first and second connecting parts to the termination of the output of the laser beam. The presently disclosed subject matter can be applied to other various types of apparatuses configured to form a propagation channel configured to propagate laser beam from a laser light source between a pair of connecting parts upon connection of the pair of connecting parts, such as outdoor illumination devices, indoor illumination devices, light projectors, and the like disclosed in Japanese Patent Application Laid-Open No. 2004-260027.

Furthermore, the various numerical values shown in the exemplary embodiment(s) and the modified example(s) are illustrative and various suitable numerical values can be adopted as long as the advantageous effects of the presently disclosed subject matter can be exerted.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A light emitting apparatus comprising:
    a laser light source;
    a driving circuit configured to supply a drive current to the laser light source;
    a power supply cable configured to supply drive power to the driving circuit;
    a first connecting part; and
    a second connecting part configured to be connected to the first connecting part, the first connecting part and the second connecting part being connected to each other to form a propagation channel between the first and second connecting parts through which laser beam from the laser light source can propagate, wherein
    the power supply cable includes a pair of end parts provided in a middle thereof and connected to and separated from each other,
    the first connecting part includes one of the pair of terminals, and the second connecting part includes the other one of the pair of terminals,
    when the first connecting part and the second connecting part are connected to each other, the one terminal and the other terminal of the power supply cable is connected to each other to constitute a supply channel configured to supply the drive power to the driving circuit, and
    when the first and second connecting parts are disconnected, the connected terminals of the power supply cable is separated from each other to cut off the supply channel configured to supply the drive power to the driving circuit.

2. The light emitting apparatus according to claim 1, further comprising:
    a first optical member; and
    an optical fiber configured to propagate the laser beam from the laser light source to the first optical member, wherein
    the optical fiber includes a pair of end parts provided in a middle thereof and connected to and separated from each other,
    the first connecting part includes one of the pair of end parts of the optical fiber and the one terminal of the pair of terminals of the power supply cable,
    the second connecting part includes the other of the pair of end parts of the optical fiber and the other terminal of the pair of connectable terminals of the power supply cable,
    when the first connecting part and the second connecting part are connected to each other, the one end part of the optical fiber and the other end part thereof are connected to each other so as to constitute a propagation channel configured to propagate the laser beam from the laser light source to the first optical member, and the one terminal of the power supply cable and the other terminal thereof are connected to each other so as to constitute the supply channel configured to supply the drive power to the driving circuit, and
    when the first and second connecting parts are disconnected, the connected end parts of the optical fiber are separated from each other to cut off the propagation channel configured to propagate the laser beam from the laser light source to the first optical member and the connected terminals of the power supply cable are separated from each other to cut off the supply channel configured to supply the drive power to the driving circuit.

3. The light emitting apparatus according to claim 2, further comprising a protective tube configured to cover the optical fiber.

4. The light emitting apparatus according to claim 3, wherein the first optical member is a member configured to perform any of mixing, scattering, dispersing, and wavelength-converting laser beams propagating through the optical fiber.

5. The light emitting apparatus according to claim 4, further comprising a second optical member configured to form a predetermined light distribution pattern by any of reflecting, deflecting, scattering, and shielding light derived from the first optical member.

6. The light emitting apparatus according to claim 3, further comprising a second optical member configured to form a predetermined light distribution pattern by any of reflecting, deflecting, scattering, and shielding light derived from the first optical member.

7. The light emitting apparatus according to claim 2, wherein the first optical member is a member configured to perform any of mixing, scattering, dispersing, and wavelength-converting laser beams propagating through the optical fiber.

8. The light emitting apparatus according to claim 7, further comprising a second optical member configured to form a predetermined light distribution pattern by any of reflecting, deflecting, scattering, and shielding light derived from the first optical member.

9. The light emitting apparatus according to claim 2, further comprising a second optical member configured to form a predetermined light distribution pattern by any of reflecting, deflecting, scattering, and shielding light derived from the first optical member.

10. The light emitting apparatus according to claim 1, further comprising a protective tube configured to cover the optical fiber.

11. The light emitting apparatus according to claim 10, wherein the first optical member is a member configured to perform any of mixing, scattering, dispersing, and wavelength-converting laser beams propagating through the optical fiber.

12. The light emitting apparatus according to claim 11, further comprising a second optical member configured to form a predetermined light distribution pattern by any of reflecting, deflecting, scattering, and shielding light derived from the first optical member.

13. The light emitting apparatus according to claim 10, further comprising a second optical member configured to form a predetermined light distribution pattern by any of reflecting, deflecting, scattering, and shielding light derived from the first optical member.

14. A vehicle lighting fixture comprising a light emitting apparatus including:
a laser light source;
a driving circuit configured to supply a drive current to the laser light source;
a power supply cable configured to supply drive power to the driving circuit;
a first connecting part; and
a second connecting part configured to be connected to the first connecting part, the first connecting part and the second connecting part being connected to each other to form a propagation channel between the first and second connecting parts through which laser beam from the laser light source can propagate, wherein
the power supply cable includes a pair of end parts provided in a middle thereof and connected to and separated from each other,
the first connecting part includes one of the pair of terminals, and the second connecting part includes the other one of the pair of terminals,
when the first connecting part and the second connecting part are connected to each other, the one terminal and the other terminal of the power supply cable is connected to each other to constitute a supply channel configured to supply the drive power to the driving circuit, and
when the first and second connecting parts are disconnected, the connected terminals of the power supply cable is separated from each other to cut off the supply channel configured to supply the drive power to the driving circuit.

15. The vehicle lighting fixture according to claim 14, wherein the light emitting apparatus further includes: a first optical member, and an optical fiber configured to propagate the laser beam from the laser light source to the first optical member,
the optical fiber includes a pair of end parts provided in a middle thereof and connected to and separated from each other,
the first connecting part includes one of the pair of end parts of the optical fiber and the one terminal of the pair of terminals,
the second connecting part includes the other of the pair of end parts of the optical fiber and the other terminal of the pair of connectable terminals,
when the first connecting part and the second connecting part are connected to each other, the one end part of the optical fiber and the other end part thereof are connected to each other so as to constitute a propagation channel configured to propagate the laser beam from the laser light source to the first optical member, and the one terminal of the power supply cable and the other terminal thereof are connected to each other so as to constitute the supply channel configured to supply the drive power to the driving circuit, and
when the first and second connecting parts are disconnected, the connected end parts of the optical fiber are separated from each other to cut off the propagation channel configured to propagate the laser beam from the laser light source to the first optical member and the connected terminals of the power supply cable are separated from each other to cut off the supply channel configured to supply the drive power to the driving circuit.

16. The vehicle lighting fixture according to claim 14, wherein the light emitting apparatus further includes a protective tube configured to cover the optical fiber.

17. The vehicle lighting fixture according to claim 15, wherein the light emitting apparatus further includes a protective tube configured to cover the optical fiber.

18. The vehicle lighting fixture according to claim 15, wherein the first optical member is a member configured to perform any of mixing, scattering, dispersing, and wavelength-converting laser beams propagating through the optical fiber.

19. The vehicle lighting fixture according to claim 15, wherein the light emitting apparatus further includes a second optical member configured to form a predetermined light distribution pattern by any of reflecting, deflecting, scattering, and shielding light derived from the first optical member.

* * * * *